UNITED STATES PATENT OFFICE.

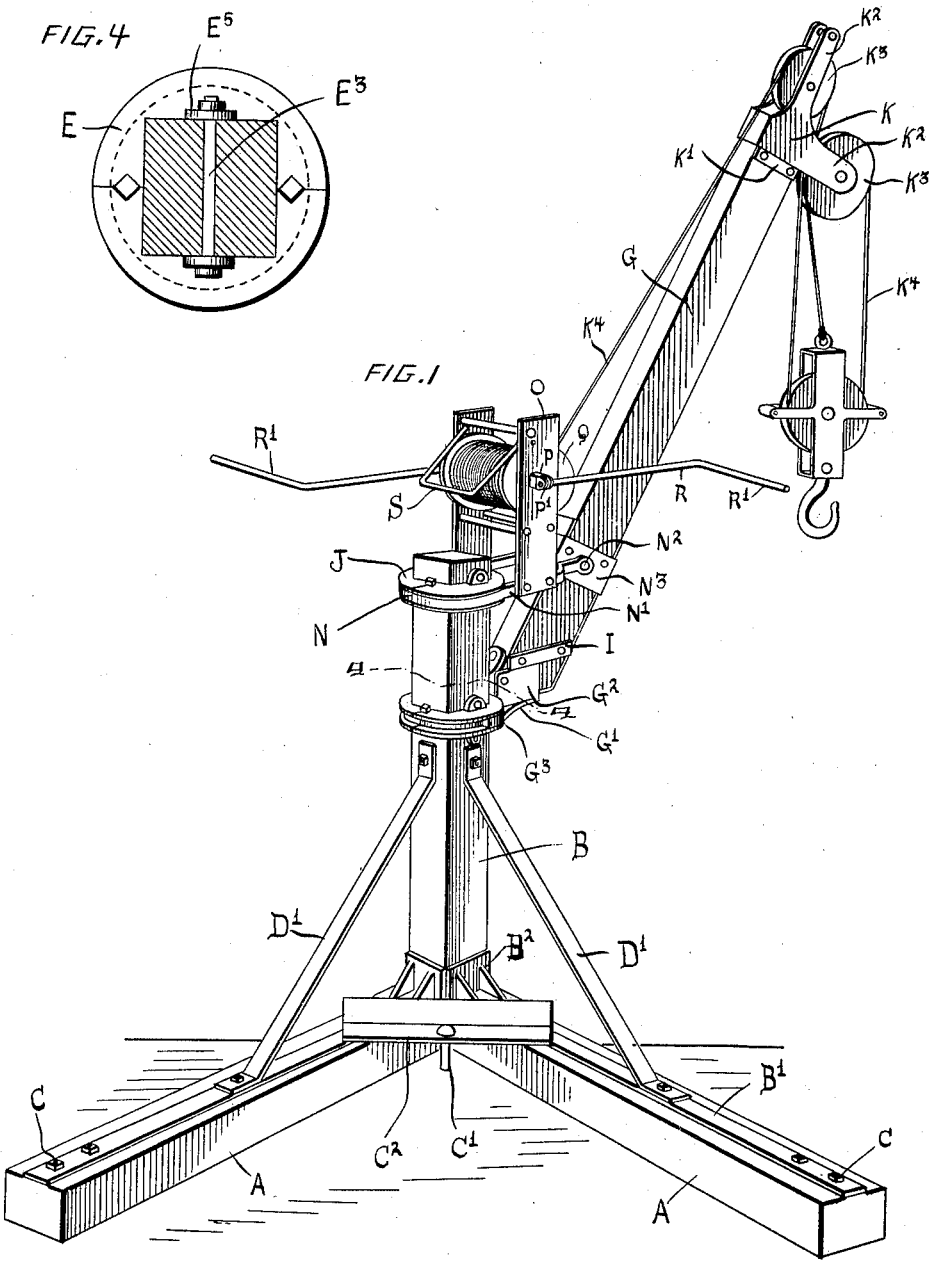

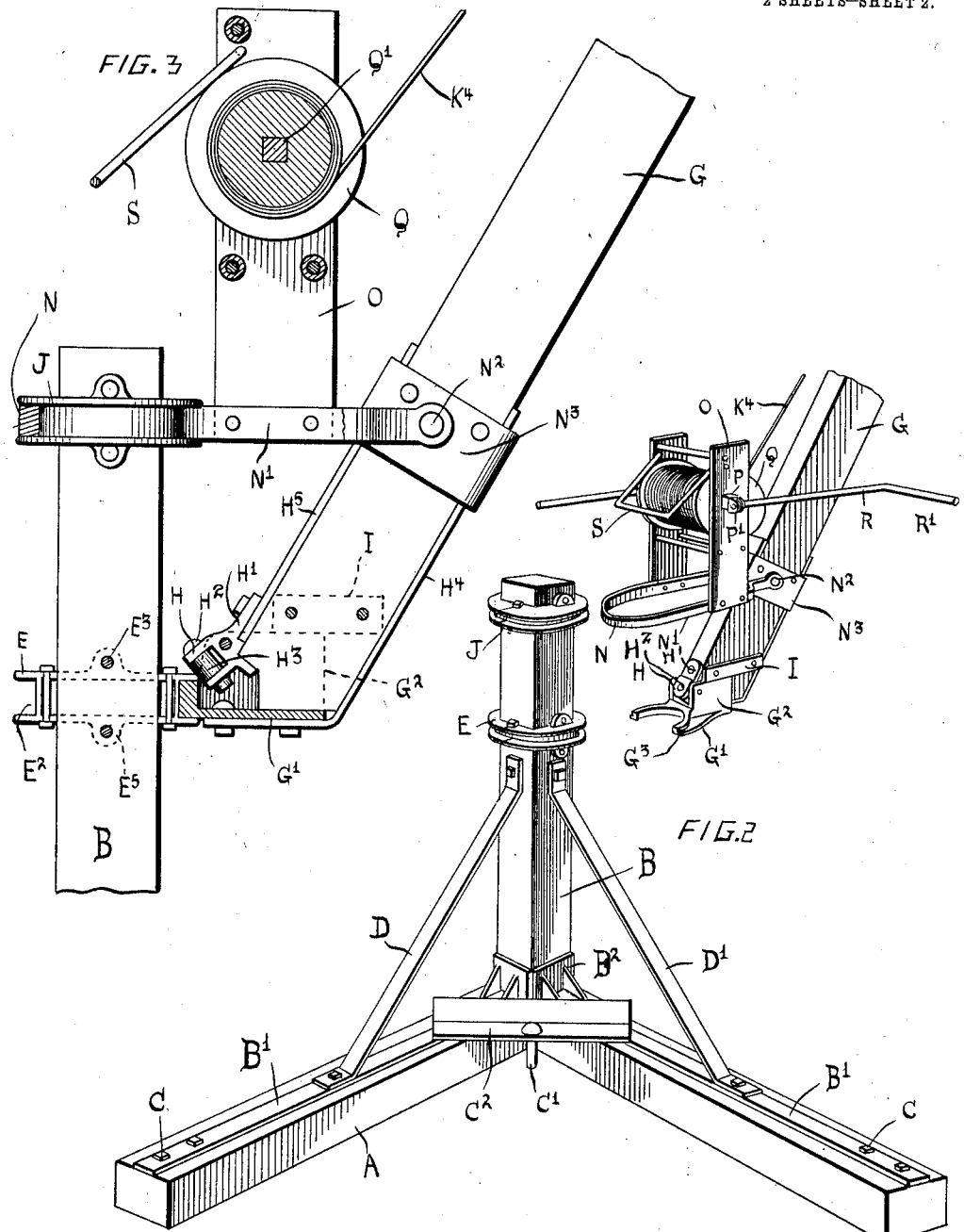

JOHN L. TAYLOR, OF PORTLAND, OREGON.

HAND-DERRICK.

1,003,072.   Specification of Letters Patent.   Patented Sept. 12, 1911.

Application filed October 1, 1910. Serial No. 584,895.

*To all whom it may concern:*

Be it known that I, JOHN L. TAYLOR, a citizen of the United States, residing at Portland, in the county of Multnomah and State of Oregon, have invented certain new and useful Improvements in Hand-Derricks; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in hand derricks and the object in view is to produce a simple and efficient device of this nature so constructed that it may be conveniently taken apart when desired.

The invention comprises various details of construction and combinations and arrangements of parts which will be hereinafter fully described and then specifically defined in the appended claims.

I illustrate my invention in the accompanying drawings, in which:—

Figure 1 is a perspective view showing the device put together. Fig. 2 is a similar view showing the swinging beam in readiness to be applied to the post for supporting the same. Fig. 3 is an enlarged sectional view transversely through one of the swiveled connections between the beam and post and Fig. 4 is a cross sectional view through the post and members in which the swinging derrick is mounted.

Reference now being had to the details of the drawings by letter, A, A designate the base beams of the apparatus which are mortised together and securely braced by the bracket members $B^2$ which are angular shaped and fastened by means of lag screws, bolts or other fastening means, and rising from the meeting ends of the beams is a post B. Fastened to the upper faces of said beams are the metallic plates B' which abut against said bracket members and are held in place upon the beams by means of bolts or lag screws C. An angle iron $C^2$ is placed diagonally across the adjacent edges of said brace beams and is engaged by a rod C', designed to be attached to a stationary object, not shown, and serving to securely hold the apparatus to the object upon which it rests. Suitable braces D' are secured at their upper ends to said post. Complemental swivel bearing members E, E which have grooves $E^2$ in their outer edges are fastened to the post B, the two sections when placed together forming a complete circular bearing surface. Each of said bearing members has integral ears $E^5$ which are apertured and which are adapted to receive bolts $E^3$ passing therethrough and also through the post. A beam G, which may be of any suitable material and size, has fastened to its lower end a bearing member G' with two parallel flanges $G^2$ which engage the opposite edges of the beam G, and a concaved bearing member, designated by letter $G^3$, is formed integral with one end of said member G' and is swiveled in the groove formed by the two complemental bearing members above referred to.

It will be noted that a space intervenes between the bottom of the member G' and the end of the beam to which it is fastened and within said space and between the flanges $G^2$ is positioned the forked end H of a bracket member H', which latter is bolted to the beam G, and a pivotal pin $H^2$ is mounted in said forked end of the bracket member and an anti-friction roller $H^3$ is journaled upon said pin and is adapted to bear against the upper flanges of the bearing members E, E to distribute the weight of the beam G. An angle iron $H^4$ is fastened by bolts to the members G' and also to the edge of the beam G, while a bar $H^5$ is fastened to the opposite edge of the beam G and to which the bracket member H is fastened. Suitable bars, designated by letter I, are fastened by bolts to the opposite faces of the beam G and their lower edges are in contact with the marginal edges of the member G' and serve to prevent the same from shirring or rocking.

A cap, designated by letter K, is fastened to the upper end of the beam G and said cap is recessed and plates or bars K' are bolted to the beam and engage said cap and also serve to securely hold the same from rocking thereon. Integral arms $K^2$ project from said cap and have pulleys $K^3$ journaled therein and about which the cable $K^4$ is adapted to pass.

A second set of complemental bearing members, designated by letter J, which are provided with circumferential flanged grooves, are fastened to the post parallel with the bearing members E, E and adapted to receive the concaved end N of the plate N' which is pivotally mounted upon a bolt N² passing through the plate N³ upon the beam G. Rising from said plate N' are the parallel plates O in which a winding drum Q is journaled, having a longitudinal aperture therethrough which is angular to receive the angular shaft Q', and about which drum the cable K⁴ is adapted to wind. A socket member P is adapted to receive one end of said angled shaft to which it is fastened and which member P has a forked end P', the arms of which are apertured for the reception of the shank portion R of the handle R'.

A bail-shaped bracket member S has its ends bent at angles and journaled in apertures in said parallel plates and serves to be moved frictionally against the flanges of the drum to regulate the speed at which the cable may be unreeled. It will be noted that the post is of such a height that an operator, when standing, may operate with each hand a crank handle similarly constructed and one connected to each end of the shaft carrying the drum and thereby operate both cranks at one time, one hand pulling while the other pushes.

From the foregoing, when taken in connection with the drawings, it will be noted that the operation of my invention will be readily understood and also the manner of putting the parts together for use or disconnecting the same when desired and reduce the same to a compact form for storage or shipment.

What I claim to be new is:—

1. A knock-down derrick apparatus comprising a post, a base therefor, complemental groove bearing members fastened in pairs to the post, a swinging beam, a swiveled member fixed to the latter and adapted to engage one pair of said bearing members, a strap fastened to the beam and adapted to have a swivel connection with the other set of bearing members upon the post, and anti-friction means fixed to the beam and adapted to engage the bearing members against which said swivel member contacts.

2. A knock-down derrick apparatus comprising a post, a base therefor, complemental groove bearing members fastened in pairs to the post, a swinging beam, a swiveled member fixed to the latter and adapted to engage one pair of said bearing members, a strap fastened to the beam and adapted to have a swivel connection with the other set of bearing members upon the post, an anti-friction roller journaled upon the beam and adapted to bear against the pair of bearing members engaged by said swivel member.

3. A knock-down hand derrick comprising a post, a base therefor, complemental grooved and flanged bearing members fastened in pairs to the post, a beam, a bracket member fastened to the lower end thereof and having a concaved end adapted to engage one of said pairs of bearing members, and an anti-friction roller carried by said beam and in contact with the flanges of said bearing members and in which said concaved portion of the bracket member engages.

4. A knock-down hand derrick comprising a post, a base therefor, complemental grooved and flanged bearing members fastened in pairs to the post, a beam, a bracket member fastened to the lower end thereof and having a concaved end adapted to engage one of said pairs of bearing members, metallic plates fastened to said beam on opposite edges thereof, an anti-friction roller carrying bracket member shouldered upon its inner face to engage over the end of one of said plates and fastened to said beam, a roller carried by said shouldered bracket member and bearing against the upper of the flanges of one pair of said bearing members.

In testimony whereof I hereunto affix my signature in the presence of two witnesses.

JOHN L. TAYLOR.

Witnesses:
J. BUTCHER,
M. C. VAN TYNE.

---

Copies of this patent may be obtained for five cents each, by addressing the "Commissioner of Patents, Washington, D. C."